(12) United States Patent
Ozaki et al.

(10) Patent No.: US 10,345,782 B2
(45) Date of Patent: Jul. 9, 2019

(54) ROBOT CONTROL DEVICE AND COMMUNICATION SYSTEM HAVING COMMUNICATION FUNCTION FOR COMMUNICATING WITH PROGRAMMABLE LOGIC CONTROLLER

(71) Applicant: FANUC CORPORATION, Yamanashi (JP)

(72) Inventors: Shunichi Ozaki, Yamanashi (JP); Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 164 days.

(21) Appl. No.: 15/371,771

(22) Filed: Dec. 7, 2016

(65) Prior Publication Data
US 2017/0168474 A1    Jun. 15, 2017

(30) Foreign Application Priority Data

Dec. 9, 2015 (JP) ................................. 2015-240428

(51) Int. Cl.
*G05B 19/05* (2006.01)
*H04L 29/08* (2006.01)

(52) U.S. Cl.
CPC .............. *G05B 19/05* (2013.01); *H04L 67/06* (2013.01); *H04L 67/34* (2013.01); *G05B 19/056* (2013.01); *G05B 2219/39371* (2013.01); *G05B 2219/40414* (2013.01); *G05B 2219/40514* (2013.01)

(58) Field of Classification Search
CPC ................. G05B 19/05; G05B 19/056; G05B 2219/39371; G05B 2219/40414; G05B 2219/40514
See application file for complete search history.

(56) References Cited

U.S. PATENT DOCUMENTS

| 8,014,898 | B2 | 9/2011 | Nishi et al. |
| 9,233,469 | B2 | 1/2016 | Lee et al. |
| 2006/0191005 | A1* | 8/2006 | Muhamed ............. H04W 28/16 726/15 |
| 2008/0058993 | A1* | 3/2008 | Tain ................. G05B 19/41845 700/275 |
| 2014/0156710 | A1 | 6/2014 | VanGompel |
| 2014/0337551 | A1 | 11/2014 | Cho |

(Continued)

FOREIGN PATENT DOCUMENTS

| CN | 101092031 A | 12/2007 |
| CN | 104813246 A | 7/2015 |

(Continued)

*Primary Examiner* — Khoi H Tran
*Assistant Examiner* — Robert T Nguyen
(74) *Attorney, Agent, or Firm* — RatnerPrestia

(57) ABSTRACT

A communication system according to an embodiment of the present invention includes a robot control device, a programmable logic controller for establishing communication with the robot control device, and a communication setting device that is loaded with a configuration file to define communication parameters used in the communication. The communication setting device sets the communication parameters to the programmable logic controller. The robot control device includes a file output unit for outputting the configuration file depending on an internal state of the robot control device.

4 Claims, 3 Drawing Sheets

(56) References Cited

U.S. PATENT DOCUMENTS

| | | |
|---|---|---|
| 2015/0127120 A1 | 5/2015 | Telljohann et al. |
| 2015/0286204 A1 | 10/2015 | Yamaoka et al. |
| 2017/0272459 A1* | 9/2017 | Rusakov ............... G06F 16/951 |
| 2017/0272460 A1* | 9/2017 | Rusakov ............. H04L 41/0809 |
| 2018/0183904 A1* | 6/2018 | Zhao .................... H04L 67/125 |

FOREIGN PATENT DOCUMENTS

| | | |
|---|---|---|
| CN | 104842361 A | 8/2015 |
| JP | 61056786 A | 3/1986 |
| JP | H11212608 A | 8/1999 |
| JP | 2009301469 A | 12/2009 |
| JP | 2010191602 A | 9/2010 |
| JP | 2011-062798 A | 3/2011 |

* cited by examiner

ROBOT CONTROL DEVICE AND COMMUNICATION SYSTEM HAVING COMMUNICATION FUNCTION FOR COMMUNICATING WITH PROGRAMMABLE LOGIC CONTROLLER

This application is a new U.S. patent application that claims benefit of JP 2015-240428 filed on Dec. 9, 2015, the content of 2015-240428 is incorporated herein by reference.

BACKGROUND OF THE INVENTION

1. Field of the Invention

The present invention relates to a robot control device and a communication system, and specifically relates to a robot control device and a communication system having a communication function for communicating with a programmable logic controller.

2. Description of Related Art

Programmable logic controllers can be currently used for controlling factories. To let the programmable logic controllers communicate with robot control devices, configuration files can be used for communication setup (for example, Japanese Unexamined Patent Publication (Kokai) No. 2011-062798). The configuration file includes the following data, for example: the version of the file, a vendor ID, a vendor name, image data, a description of an apparatus, the name of the apparatus, the version of the apparatus, a company's URL, a required timeout, a response timeout, the type of the apparatus, a profile, the name of data, the bit size of the data, sequence information, the type of the data, a sub-item, a bit offset, an access restriction, a product code, a serial number, the number of objects, the name of a data set, the type of a device, the name of the device, a software version, a start address, the data size of firmware, the maximum number of I/O connections, the maximum number of message connections, a data range, the type of connection, supported functions, the type of transfer, a communication speed, etc.

The configuration file is prepared for each of apparatuses that communicate with the programmable logic controllers, such as robots, sensors, and I/O units. By loading the configuration file into a personal computer (PC) that is connected to the programmable logic controller, the programmable logic controller communicating with a robot can be easily set up. Application software accompanying the programmable logic controller is installed in advance on the PC, and the configuration file is loaded into the PC by the application software.

The application software accompanying the programmable logic controller establishes communication between the PC and the programmable logic controller, and the PC sets up the programmable logic controller according to the loaded configuration file. The PC and the programmable logic controller are connected by USB, Ethernet(™), or serial communications. On the application software accompanying the programmable logic controller, the programmable logic controller can be also set manually without using the configuration file. In this case, however, an icon corresponding to the apparatus may not appear, or an appropriate device name may not be able to be set. The configuration file may be present differently from one communication function to another and besides may come in a plurality of versions due to updates.

Communication functions for factory automation apparatuses have not been integrated as much as communication functions for PCs. There are many types of communication functions for the factory automation apparatuses, such as CC-Link, CC-Link IE Field, CC-Link IE Control, DeviceNet, DeviceNet Safety, Ether CAT, EtherNet(™)/IP, Profibus, PROFINET I/O, FL-net, Modbus, and ControlNet.

At present, the configuration files, etc., are downloaded from companies' websites or obtained from accompanying CDs, USB memory sticks, etc. Besides, the configuration files, etc., may be offered by service sales agents. The downloading method requires users to find out the appropriate configuration file or the like by following links on web pages, thus requiring effort of the users.

Also, in this method, the users may be deprived of access to the configuration file or the like, when the address of the website on which the configuration file or the like is posted has been changed. To prevent this situation, the company that offers the configuration files, etc., has to keep the configuration files, etc., posted for long time on the website of the same address. However, an extensive modification of the website may hinder the configuration files, etc., from being kept posted on the website of the same address. Even if the configuration files, etc., can be kept posted on the website of the same address, this constraint reduces flexibility in the modification of the website. Also, keeping the configuration files, etc., posted on the website causes an increase in management and maintenance costs.

To obtain the configuration file or the like, the user has to find the software configuration, software version, setting information, etc., of the robot control device. Furthermore, the user may also have to browse the Internet or follow the links based on the found information. This interferes with easy obtainment of the configuration file appropriate to the robot control device.

There are many types of software configurations, such as CC-Link IE Field, DeviceNet, DeviceNet Safety, Ether CAT, EtherNet(™)/IP adapter, Profibus Master, Profibus Slave, PROFINET I/O, and Dual channel PROFINET, and some robot control devices comply with a plurality of configurations. Thus, it takes time to determine the software configuration, and sometimes an incorrect software configuration may be selected.

When the configuration file or the like is offered using the CD, the USB memory stick, or the like, production of the CDs, the USB memory sticks, etc., having the configuration file stored therein requires increased effort and cost.

When the configuration file or the like is offered by the service sales agent, the user has to inform the agent of the software configuration, the software version, the setting information, etc., thus requiring effort by the user. This method also requires effort for support of the service sales agent.

SUMMARY OF THE INVENTION

The present invention aims at providing a robot control device and a communication system that can easily generate a configuration file for appropriately setting communication parameters to establish communication between a programmable logic controller and the robot control device.

A communication system according to an embodiment of the present invention includes a robot control device, a programmable logic controller for establishing communication with the robot control device, and a communication setting device loaded with a configuration file to define communication parameters used in the communication. The communication setting device sets the communication parameters to the programmable logic controller. The robot control device includes a file output unit for outputting the configuration file depending on an internal state of the robot control device.

A robot control device according to an embodiment of the present invention establishes communication with a programmable logic controller in which communication settings have already been made. The communication settings are made between the robot control device and the programmable logic controller through a communication setting device that is loaded with a configuration file to define communication parameters used in the communication. The robot control device includes a file output unit for outputting the configuration file depending on an internal state of the robot control device.

BRIEF DESCRIPTION OF THE DRAWINGS

The objects, features, and advantages of the present invention will be more apparent from the following description of an embodiment in conjunction with the attached drawings, wherein.

DETAILED DESCRIPTION OF THE INVENTION

A communication system and a robot control device according to the present invention will be described below with reference to the drawings.

Figure 1:
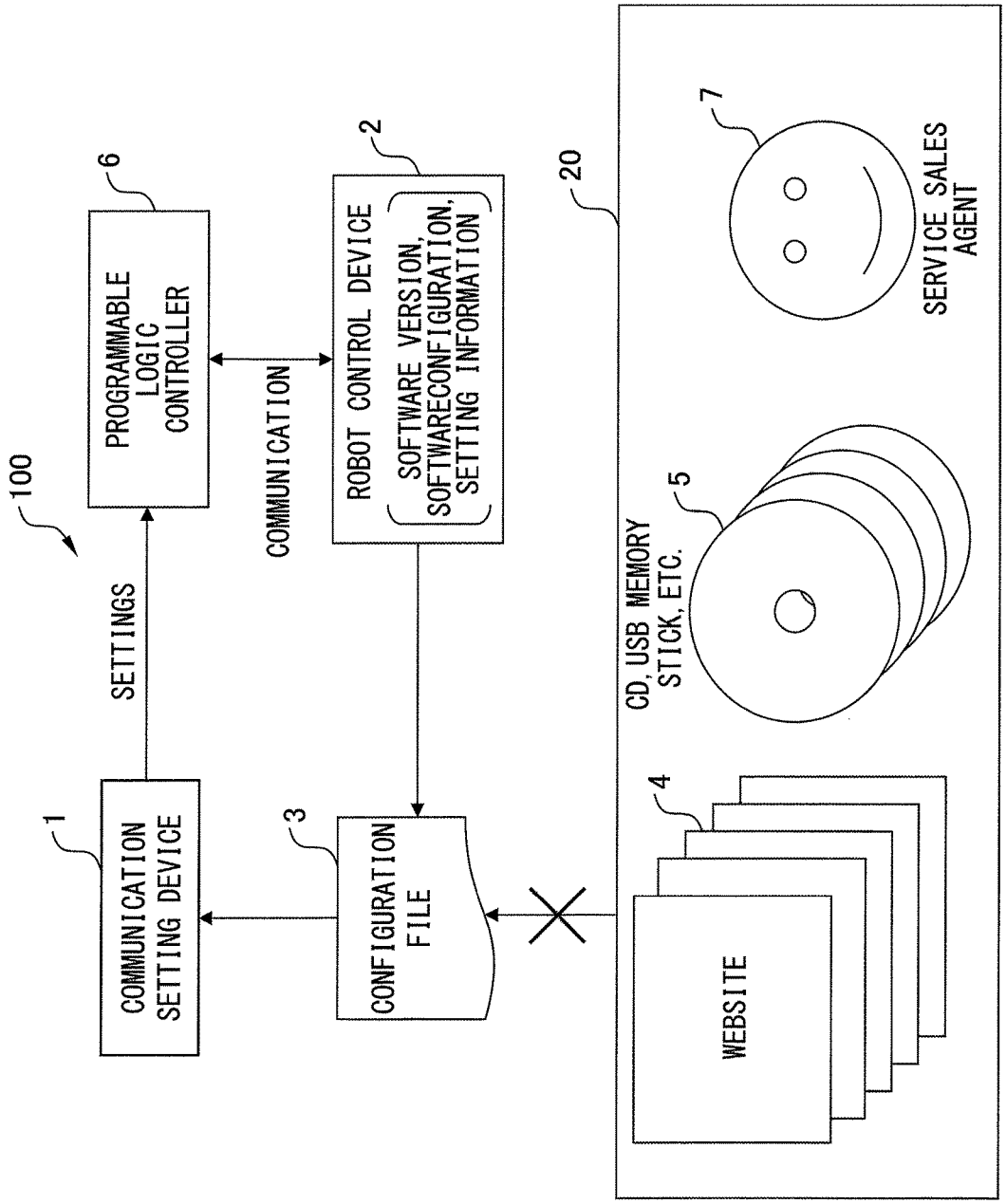
FIG. 1 is a block diagram of a communication system according to an embodiment of the present invention.

A communication system according to an embodiment of the present invention will be first described. FIG. 1 is a block diagram of the communication system according to the embodiment of the present invention. A communication system 100 according to the embodiment of the present invention includes a robot control device 2, a programmable logic controller 6, and a communication setting device 1.

The programmable logic controller 6 establishes communication with the robot control device 2.

The communication setting device 1 is loaded with a configuration file 3, which defines communication parameters to establish the communication between the robot control device 2 and the programmable logic controller 6, and sets the communication parameters to the programmable logic controller 6.

The configuration file 3 is fetched from the robot control device 2 using a USB memory stick, memory card, FTP, or the like. The fetched configuration file 3 preferably adheres to the software version, software configuration, and setting information of the robot control device 2. Thus, a user can easily obtain the appropriate configuration file 3. The "software version" refers to the version of software to achieve an application-specific function of a robot. The "software configuration" refers to the configuration of the software to achieve the application-specific function of the robot.

Figure 2:
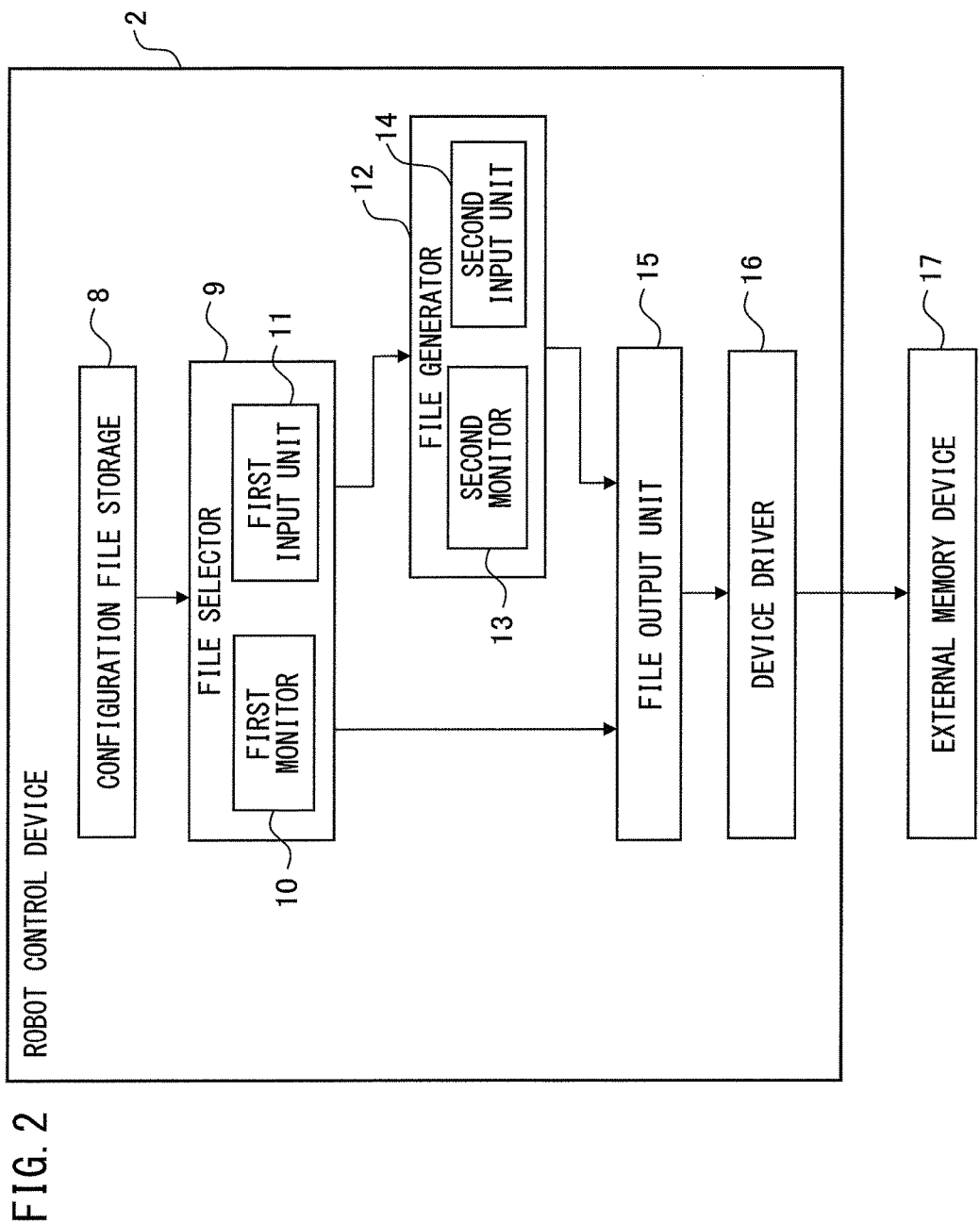
FIG. 2 is a block diagram of a robot control device according to the embodiment of the present invention.

Next, the robot control device according to the embodiment of the present invention will be described. FIG. 2 is a block diagram of the robot control device 2 according to the embodiment of the present invention. The robot control device 2 establishes communication with the programmable logic controller 6 in which communication settings have already been made. The communication settings are made through the communication setting device 1, which is loaded with the configuration file 3 to define the communication parameters used in the communication between the robot control device 2 and the programmable logic controller 6. The robot control device 2 includes a file output unit 15, which outputs the configuration file 3 depending on an internal state of the robot control device 2. The internal state of the robot control device 2 includes the software configuration, software version, and setting information.

The robot control device 2 includes configuration file storage 8, a file selector 9, a file generator 12, the file output unit 15, and a device driver 16. The configuration file 3 is stored in the configuration file storage 8 at the time of manufacturing the robot control device 2. The user inputs a command to fetch the configuration file 3 using a first monitor 10 and a first input unit 11 of the file selector 9. When there are a plurality of types of configuration files 3, a query is displayed on the first monitor 10 of the file selector 9. The user makes an appropriate choice by an input to the first input unit 11, so that the appropriate configuration file 3 is easily fetched from the robot control device 2.

When a new file is required to be generated according to the choice, another query is displayed on a second monitor 13 of the file generator 12. The user makes an appropriate choice by an input to a second input unit 14 of the file generator 12. Thus, the file generator 12 generates an appropriate configuration file 3 based on a file selected by the file selector 9.

The file output unit 15, which is commanded by the upper stage to output the file, outputs the configuration file 3 to an external memory device 17 through the device driver 16. The device driver 16 allows the file output unit 15 to output the configuration file 3 to various types of external memory devices 17 (a USB memory stick, a memory card, etc.).

Conventionally, the configuration file 3 is offered by a configuration file supplier 20 including a company's website 4, a CD, USB memory stick, etc., 5, and a service sales agent 7. However, this method requires the user to follow links on web pages to find out the appropriate configuration file 3, requiring effort of the user.

Also, in the method of posting the configuration file 3 on the company's website 4, the user may be deprived of access to the configuration file 3, when the address of the website has been changed. To prevent this situation, the company that offers the configuration file 3 has to keep the configuration file 3 posted for long time on the website of the same address. However, an extensive modification of the website or the like may hinder the configuration file 3 from being kept posted for long time on the website of the same address. Even if the configuration file 3 is kept posted on the website of the same address, this constraint reduces flexibility in the modification of the website. Also, keeping the configuration file 3 posted on the website causes an increase in management and maintenance costs.

As described above, to obtain the configuration file 3, it is conventionally required of the user to find the software configuration, software version, setting information, etc., of the robot control device 2. The user is also required to search the website 4 or follow the links on the web pages based on the found information, in order to obtain the configuration file 3. This interferes with easy obtainment of the appropriate configuration file 3.

Furthermore, when the configuration file 3 is conventionally offered by the CD, USB memory stick, etc., 5, production of the CDs, USB memory sticks, etc., having the configuration file 3 stored therein requires increased effort and cost. According to the present invention, the configuration file 3 can be installed into the robot control device 2 at the same time when installing software into the robot control device 2. Therefore, it is possible to save the effort and cost to produce the CDs, USB memory sticks, etc., having the configuration file 3 stored therein.

Furthermore, when the configuration file 3 is conventionally offered by the service sales agent 7, the user has to inform the agent of the software configuration, software version, setting information, etc., thus requiring effort of the user. This method also requires effort for support of the service sales agent 7.

According to the present invention, the user can fetch the configuration file that adheres to internal information of the robot control device 2, that is, the software configuration, software version, and setting information of the robot control device 2 from the robot control device 2. This eliminates the need for informing the service sales agent 7 of the software configuration, software version, and setting information, thus saving the effort for support of the service sales agent 7.

The robot control device 2 may include a user interface (not shown) for fetching the configuration file 3 from the file output unit 15 in the form of interaction.

Figure 3:
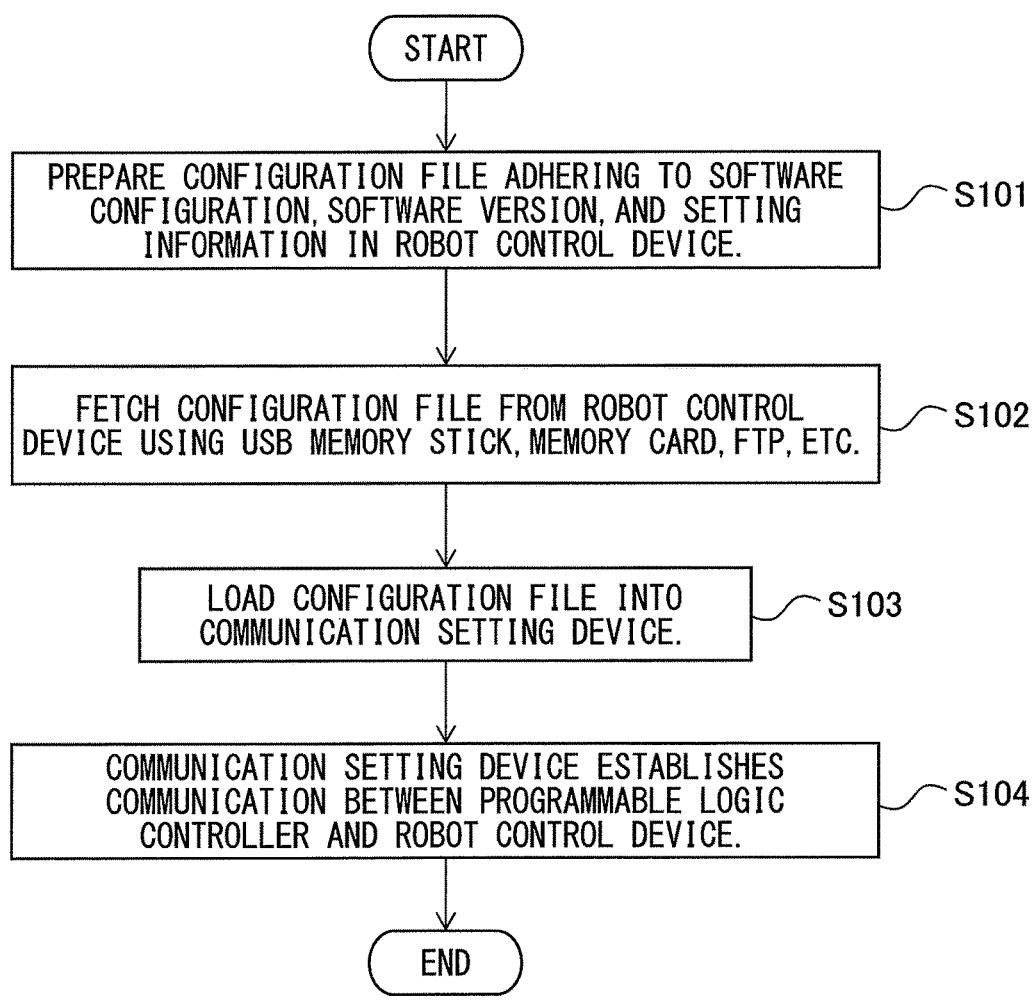
FIG. 3 is a flowchart for explaining the operation of the communication system according to the embodiment of the present invention.

Next, the operation of the communication system according to the embodiment of the present invention will be described with reference to a flowchart of FIG. 3.

First, in step S101, the configuration file 3 that adheres to the internal information of the robot control device 2, that is, the software configuration, software version, and setting information of the robot control device 2 is prepared in the robot control device 2.

Next, in step S102, the configuration file 3 is fetched from the robot control device 2 using the USB memory stick, memory card, FTP, or the like.

Next, in step S103, the configuration file 3 is loaded into the communication setting device 1.

Next, in step S104, the communication setting device 1 establishes communication between the programmable logic controller 6 and the robot control device 2.

As described above, the robot control device and the communication system according to the present invention provide the following effects:

(1) allowing the user to easily obtain the appropriate configuration file or the like;

(2) eliminating the need for keeping the configuration file, etc., posted for long time on the website, thus eliminating the need for accompanying maintenance;

(3) avoiding a situation where the configuration file disappears from the website indicated by an operation manual;

(4) avoiding a situation where an inability to change the address of the website on which the configuration file is posted turns into a constraint in modifying the website;

(5) saving labor cost of the service sales agent offering the configuration file;

(6) eliminating the need for inform the service sales agent of the software configuration, software version, setting information, etc., of the robot control device;

(7) allowing the user to immediately obtain the configuration file or the like; and (8) saving effort and cost to produce the CDs, USB memory sticks, etc., having the configuration file stored therein, and save cost for the mediums.

According to the communication system and the robot control device of the embodiment of the present invention, it is possible to easily generate the configuration file that appropriately sets up the communication parameters to establish communication between the programmable logic controller and the robot control device.

What is claimed is:

1. A robot control device for establishing communication with a programmable logic controller in which a communication setting has already been made, comprising:
    a configuration file based on an internal state of the robot control device, the internal state including a software configuration, a software version, and setting information of the robot control device; and
    a processor configured to:
        transmit the configuration file to a communication setting device that loads the configuration file on the programmable logic controller,
        establish communication with programmable logic controller using the configuration file loaded on the programmable logic controller, and
        control the robot.

2. The robot control device according to claim 1, further comprising a user interface for fetching the configuration file in an interactive manner.

3. A communication system comprising:
    robot control device including a configuration file based on an internal state of the robot control device, the internal state including a software configuration, a software version, and setting information of the robot control device;
    a programmable logic controller; and
    a communication setting device for assisting the programmable logic controller in establishing communication with the robot control device,
    wherein the communication setting device is configured to:
        receive the configuration file from the robot control device, and
        load the configuration file received from the robot control device into the programmable logic controller, and
    wherein the programmable logic controller is configured to:
        establish communication with the robot control device using the configuration file received from the communication setting device, and
        control the robot control device to control a robot.

4. The communication system according to claim 3, wherein the robot control device has a user interface for fetching the configuration file in an interactive manner.

* * * * *